(12) United States Patent
Phipps

(10) Patent No.: US 6,598,806 B2
(45) Date of Patent: Jul. 29, 2003

(54) WINDSHIELD WASHER APPARATUS FOR MARINE CRAFT

(76) Inventor: Gary G. B. Phipps, P.O. Box 91339, West Vancouver (CA), V7V 3N9

( * ) Notice: Subject to any disclaimer, the term of this patent is extended or adjusted under 35 U.S.C. 154(b) by 7 days.

(21) Appl. No.: 09/971,600

(22) Filed: Oct. 9, 2001

(65) Prior Publication Data

US 2003/0066908 A1 Apr. 10, 2003

(51) Int. Cl.[7] ................................................. B05B 1/10
(52) U.S. Cl. ................................. 239/284.1; 114/361
(58) Field of Search .......................... 239/284.1, 284.2; 114/361

(56) References Cited

U.S. PATENT DOCUMENTS

| 3,913,840 | A | 10/1975 | Kato |
| 4,210,238 | A | 7/1980 | Frost et al. |
| 4,324,363 | A | 4/1982 | Rauen, Jr. |
| 5,242,114 | A | 9/1993 | Camier et al. |
| 6,152,384 | A | 11/2000 | Lopez et al. |
| 6,227,462 | B1 | 5/2001 | Chen |
| 6,237,861 | B1 | 5/2001 | Northrop et al. |

FOREIGN PATENT DOCUMENTS

| FR | 2538327 | 6/1984 |
| GB | 2043488 | 10/1980 |

*Primary Examiner*—Lisa A. Douglas
(74) *Attorney, Agent, or Firm*—Norman M. Cameron

(57) ABSTRACT

A windshield washing apparatus for marine craft includes a reservoir container having a bracket pivotally connected thereto. The bracket can be connected to vertical, horizontal or sloping surfaces on the marine craft while the container remains level. There is a pump mounted on the reservoir. A filler fitting has a connector for mounting the fitting on the surface of the marine craft remote from the reservoir. A first conduit connects the reservoir to the filler fitting. The apparatus includes a spray nozzle and a second conduit for connecting the pump to the spray nozzle. Preferably the reservoir has positions thereon for a plurality of pumps.

24 Claims, 3 Drawing Sheets

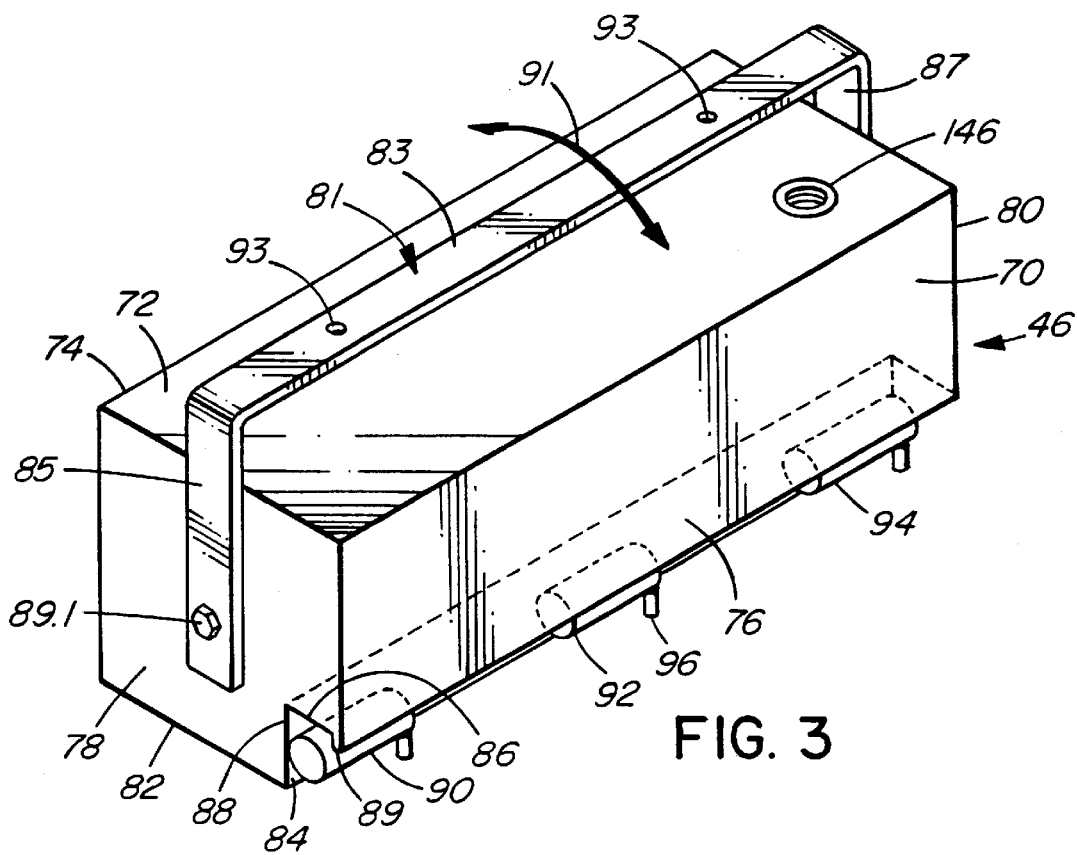
FIG. 3
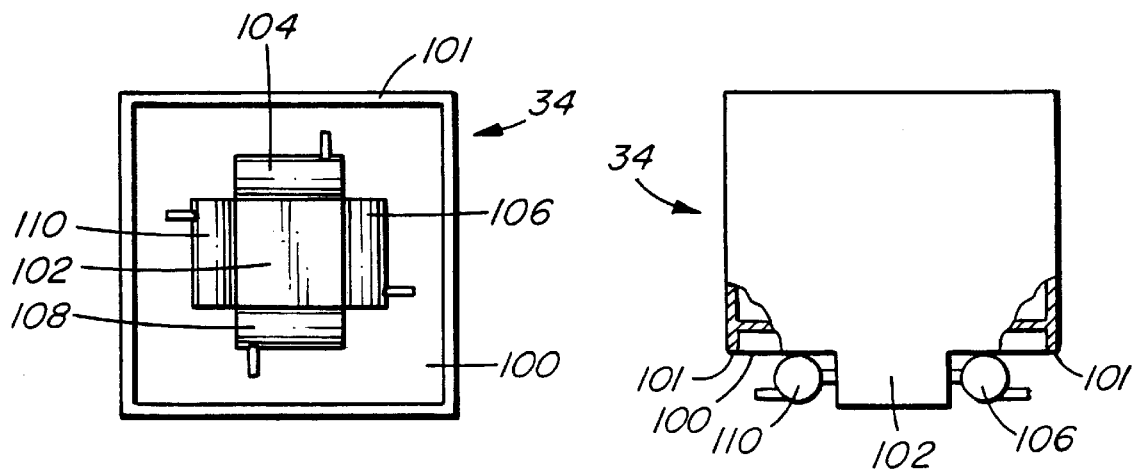
FIG. 4
FIG. 4a

WINDSHIELD WASHER APPARATUS FOR MARINE CRAFT

BACKGROUND OF THE INVENTION

This invention relates to windshield washing apparatuses and, in particular, to universal windshield washer apparatuses particularly adapted for marine craft such as pleasure boats.

Marine craft, such as pleasure boats, are not as commonly equipped with windshield washers as are, for example, automobiles. It would be desirable to equip many such craft with windshield washers to counter the effects of salt spray and other contaminants which diminish visibility and present safety problems. However it is difficult to retrofit many such craft with equipment commonly available on the market.

Various systems have been developed for washing windshields of marine craft. For example, in some systems spray nozzles are mounted on the undersides of windshield wiper arms. This means the necessity of purchasing a wiper arm specific to a particular type of spray nozzle. Furthermore, it is difficult to retrofit craft with such systems. For example, on power boats over 30 feet in length, the majority of windshield wiper motors are mounted above the tops of the windshields. This would necessitate mounting the water reservoirs somewhere along the tops of the windshields. In practice this is difficult or impossible to accomplish in many cases. The reservoir essentially would be hanging from the ceiling of the main cabin in view of the people on board and would block the view from the windshield in some cases. If the reservoir were mounted below the windshield, then the distance from the reservoir to the spray nozzles would be too long.

In some cases windshield washer systems for marine craft require water to be poured directly into the top of the reservoir. This means that the reservoir must be mounted in a location where the top can be conveniently accessed. In practice it may be difficult to find a suitable location. If the top of a reservoir cannot be accessed, then the reservoir must be removed for filling. Again this is an inconvenient operation requiring disconnection of hoses and electrical connections.

In other systems there is no reservoir, but rather a solenoid in the pressurized water supply line of the boat for a boat so-equipped with a pressurized water system. This makes the windshield washer system dependent upon the water supply system of the boat. Not all boats have pressurized water systems. Also it may be difficult to fit such a system to an existing marine craft since the water supply lines may not be readily accessible.

U.S. Pat. No. 6,237,861 to Northrop et al. discloses a window anti-icing/deicing apparatus and method. The fluid can be directed to different window surfaces including side windows, the windshield and rear window of a vehicle. However the different windows, or different areas of the vehicle, cannot be targeted separately. There is but a single pump.

U.S. Pat. No. 6,152,384 to Lopez et al. discloses a spraying device for jets of windshield washers in motor vehicles. The device includes a fixed body and a spraying body which are coupled coaxially to each other and to a nozzle body attachable to the body work and are connectable to a cleaning liquid tube.

U.S. Pat. No. 6,227,462 to Chen shows a wide-angle, atomizing-type of cleaning device for the windshield of a car. It includes a nozzle body and a universal ejector.

The prior art however does not provide an apparatus which is suitable for retrofitting many marine craft and, at the same time, which is adapted for installation in new craft during construction. Nor does it provide a solution to many problems encountered such as separately spraying different window areas. In particular the prior art does not reveal a reservoir capable of mounting on surfaces having different orientations, nor locations where the reservoir cannot be readily accessed to be filled.

It is an object of the invention to provide an improved windshield washer apparatus for marine craft which can be readily retrofitted to most marine craft and is also suitable to be installed in new craft during construction.

It is another object of the invention to provide an improved windshield washer apparatus which has a reservoir capable of mounting on surfaces and members having different orientations.

It is a further object of the invention to provide an improved windshield washer apparatus where the reservoir can be mounted in a relatively inaccessible location, but conveniently filled.

It is still a further object of the invention to provide an improved windshield washer apparatus having spray nozzles which can be adjusted to spray from different directions to accommodate different mounting surfaces and locations.

SUMMARY OF THE INVENTION

In accordance with these objects, there is provided, according to an embodiment of the invention, a windshield washer apparatus for marine craft which includes a reservoir container having a bracket pivotally connected thereto. The bracket can be connected to vertical, horizontal or sloping surfaces on the marine craft while the container remains level. There is a pump mounted on the reservoir. A filler fitting has a connector for mounting the fitting on a surface of the marine craft remote from the reservoir. A first conduit connects the reservoir to the filler fitting. The apparatus also includes a spray nozzle and a second conduit for connecting the pump to the spray nozzle.

According to another aspect of the invention, there is provided marine craft having a plurality of windshield surfaces and a windshield washing apparatus for washing the surfaces. The apparatus includes a reservoir container having a bracket pivotally connected thereto. The bracket can be connected to vertical, horizontal or sloping surfaces on the marine craft. There is a plurality of pumps mounted on the reservoir container. There is one pump for each windshield surface. A filler fitting has a connector for mounting the fitting on a surface of the marine craft remote from the reservoir container. There is a spray nozzle adjacent to each windshield surface. A filler conduit connects a filler fitting to the reservoir container. There is a plurality of discharge conduits. Each discharge conduit connects one of the pumps to one of the spray nozzles.

The invention offers significant advantages compared to the prior art. The reservoir can be located at many convenient locations within the marine craft, including mounting surfaces in different orientations such as above, below or to one side of the reservoir. In addition the reservoir does not have to be readily accessible. The reservoir can be filled through the remote fitting which can be placed in a more convenient location such as on the front deck of the marine craft. A plurality of pumps can be connected to the reservoir to provide separately controllable supplies of liquid to different window areas.

BRIEF DESCRIPTION OF THE DRAWINGS

In the drawings:

FIG. 3 is an isometric view of one of the reservoirs for the windshield washing apparatuses of FIGS. 1 and 2, showing a plurality of pumps mounted thereon and a universal mounting bracket;

FIG. 4 is a bottom plan view of a reservoir according to an alternative embodiment of the invention;

FIG. 4a is a side elevational view, partly broken away, of the reservoir of FIG. 4;

DETAILED DESCRIPTION OF THE PREFERRED EMBODIMENTS

Figure 1:
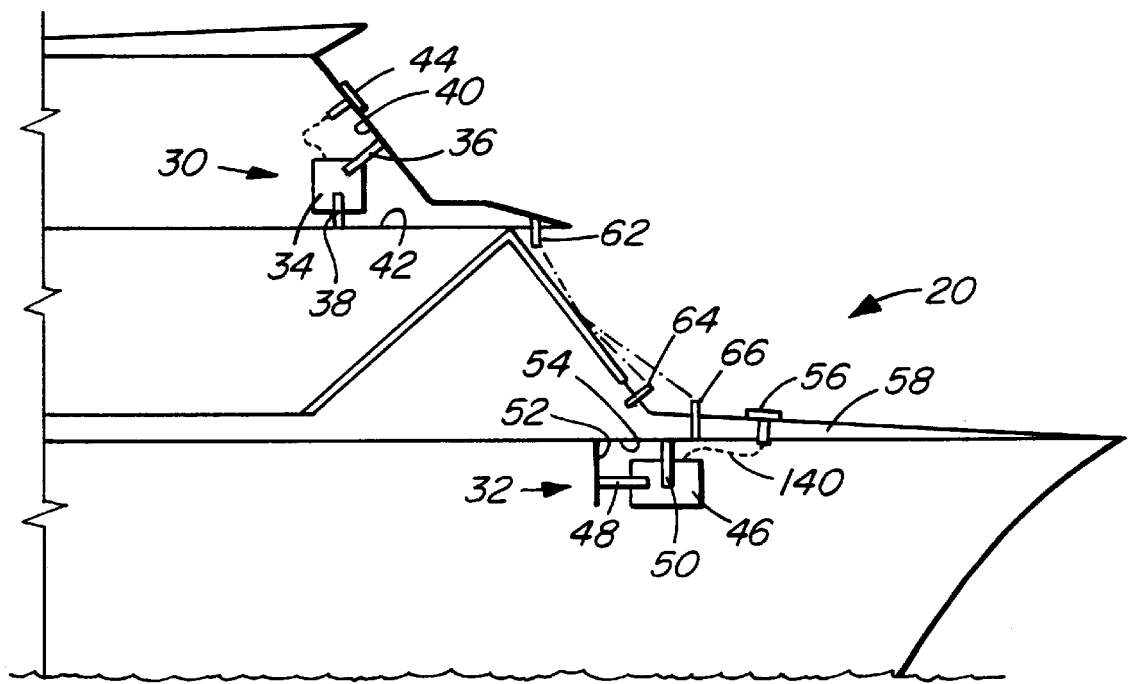
FIG. 1 is a fragmentary side elevation of a marine craft, according to an embodiment of the invention, fitted with two windshield washing apparatuses according to embodiments of the invention.
Figure 2:
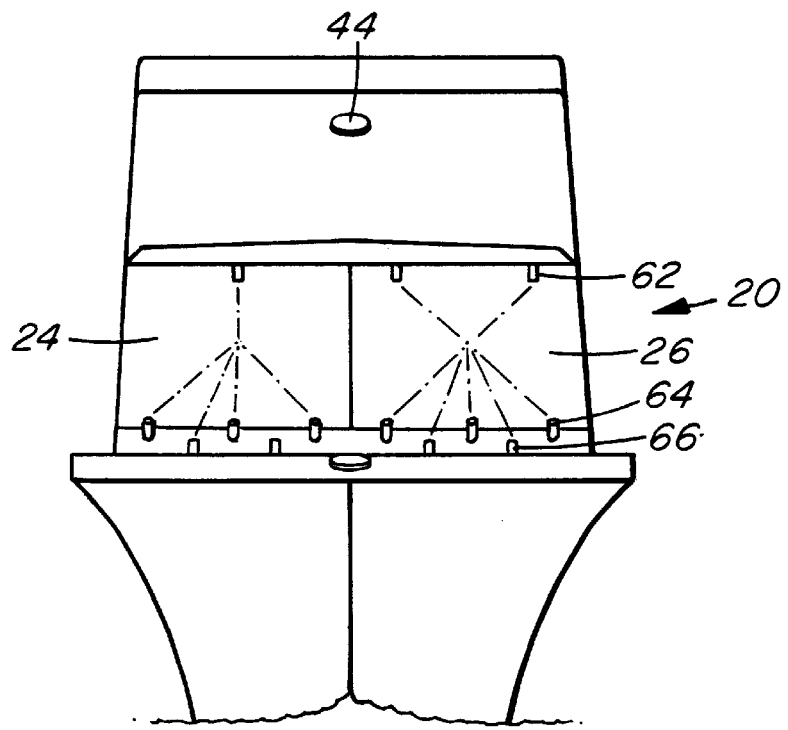
FIG. 2 is a front view thereof.

Referring to the drawings, and first to FIGS. 1 and 2, these show a marine craft 20 having a plurality of different windshields including a pair of adjacent windshields 24 and 26. Two different windshield washing apparatuses 30 and 32 are provided for windshields 24 and 26 respectively. The apparatus 30 includes a reservoir 34 having a pair of mounting brackets 36 and 38. In practice only a single bracket would be used, two brackets being shown to indicate how the reservoir can be mounted on sloping surface 40 or horizontal surface 42. The apparatus has a filler fitting 44 which is remote from the reservoir.

The apparatus 32 is generally similar and includes a reservoir 46 and a pair of brackets 48 and 50. Bracket 48 shows how the reservoir can be mounted on a vertical surface 52, while bracket 50 shows mounting on a ceiling or other horizontal surface 54 above the reservoir. Again, typically only a single such bracket would be used.

The apparatus also includes a filler fitting 56 mounted on deck 58 of the marine craft or another panel-like member. Filler conduit 140 connects the filler fitting to the reservoir 46. The apparatus also includes a plurality of rows of spray nozzles 62, 64 and 66 shown in FIG. 1. There is a plurality of spray nozzles in each row as seen in FIG. 2. A typical marine craft would not have all of the nozzles in all of the rows, these being shown for illustrative purposes.

Referring to FIG. 3, this shows reservoir 46 in more detail. It includes a hollow container 70 which, in this example, is of polyethylene although other materials could be substituted. Typically the various corners are suitably radiused although this is not shown in the drawing. As may be seen, the reservoir has a rectangular top 72, rectangular sides 74, 76, 78 and 80 and a rectangular bottom 82. There is a recessed portion 84 extending along the bottom between the bottom 82 and side 76. The recessed portion is formed by rectangular surfaces 86 and 88 in this example. A plurality of pumps 90, 92 and 94 are positioned along the recessed portion and communicate with the inside of the reservoir. Each pump has a discharge conduit, for example conduit 96 for pump 92. Each of these is connected to a different windshield surface, such as windshields 24 and 26. Each of the spray nozzles can be connected to a different pump and thus controlled separately according to cleaning requirements. Alternatively, two or more spray nozzles can be connected to the same pump.

There is ridge 89 which extends along the outer edge of the recessed portion and spaced apart from the pumps. This deflects water, including salt water, dripping down the reservoir, away from the pumps.

It should be understood that in some embodiments there may be but a single pump or there may be more than one pump. The reservoir can however have preformed positions for optionally placing the required number of pumps. For example, these may be dimples arranged along rectangular surface 88.

The reservoir also includes a U-shaped bracket 81 which includes an outer member 83 having legs 85 and 87 extending toward the reservoir. These are pivotally connected to the reservoir by bolts 89.1, only one of these being shown in FIG. 3. It may be seen that the outer member 83 is spaced-apart from container 70 and thus the bracket can be rotated, as indicated by arrows 91, about the container for different mounting positions. The bracket has a plurality of apertures 93 on the outer member which allow the bracket, and consequently the reservoir, to be mounted on a convenient surface of the watercraft by screws. The location of the pumps 90, 92 and 94 within the recessed portion 84 allows the bracket to clear the pumps as it is rotated about the container to a suitable mounting position.

Referring to FIG. 4, this is a bottom plan view of the reservoir 34 of FIG. 1. FIG. 4a is a side view thereof. In this example the reservoir has a rectangular bottom 100 having a central, rectangular protrusion 102, the recessed portion extending about the protrusion and receiving four pumps 104, 106, 108 and 110 in this example. Again the number of pumps is optional. Ridge 101, equivalent to the ridge 89 of FIG. 3, extends completely about the periphery of the bottom. FIG. 4a is partly broken away to show the shape of the ridge on both sides.

Figure 5:
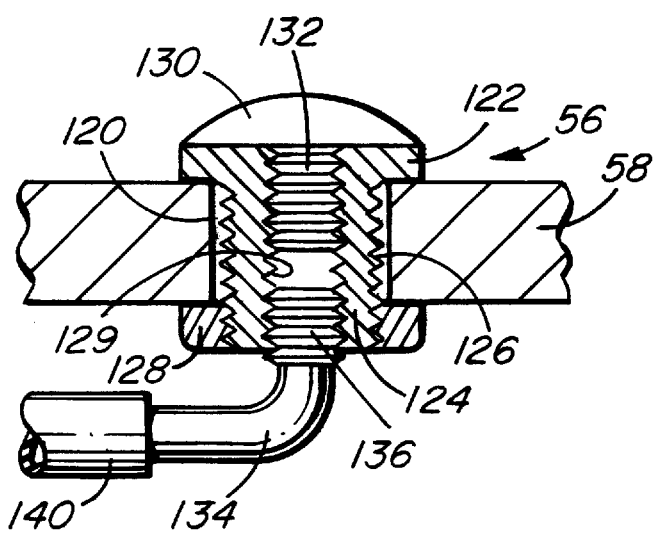
FIG. 5 is a sectional view showing a fragment of the deck of the marine craft of FIG. 1 and a remote filler fitting mounted thereon.

The reservoirs may be filled through the remote filler fittings shown in FIG. 1. For example, filler fitting 56, shown in better detail in FIG. 5, is mounted on deck 58 of the marine craft above reservoir 46. An aperture 120 is drilled through the deck to receive the fitting. The fitting includes an annular flange 122 connected to a hollow shank 124 which extends through the deck. The shank has exterior threads 126 which received a nut 128 below the deck. The nut is tightened to hold the fitting in place. The fitting also has interior threads 129. A cap 130 has a male threaded shank 132 which engages the interior threads 129 of the shank. The cap is tightened in place against the flange 122 to seal the opening and is removed in order to fill the reservoir.

An elbow 134 has a male threaded portion 136 which engages the interior threads 129 of the fitting from below. The elbow is connected to a filler conduit 140, in this case a rubber hose.

Figure 6:
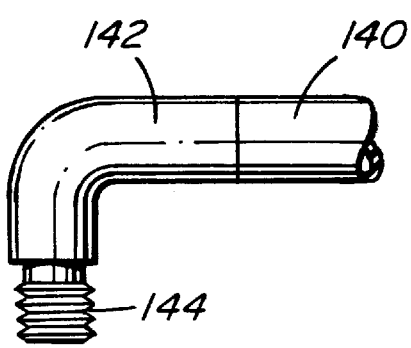
FIG. 6 is a fragmentary side view of the filler fitting for the reservoir of FIG. 3.

The opposite end of the filler conduit is connected to another elbow 142 shown in FIG. 6. The elbow has a male threaded end 144 which is received by female threaded fitting 146 of the reservoir shown in FIG. 3.

Figure 7:
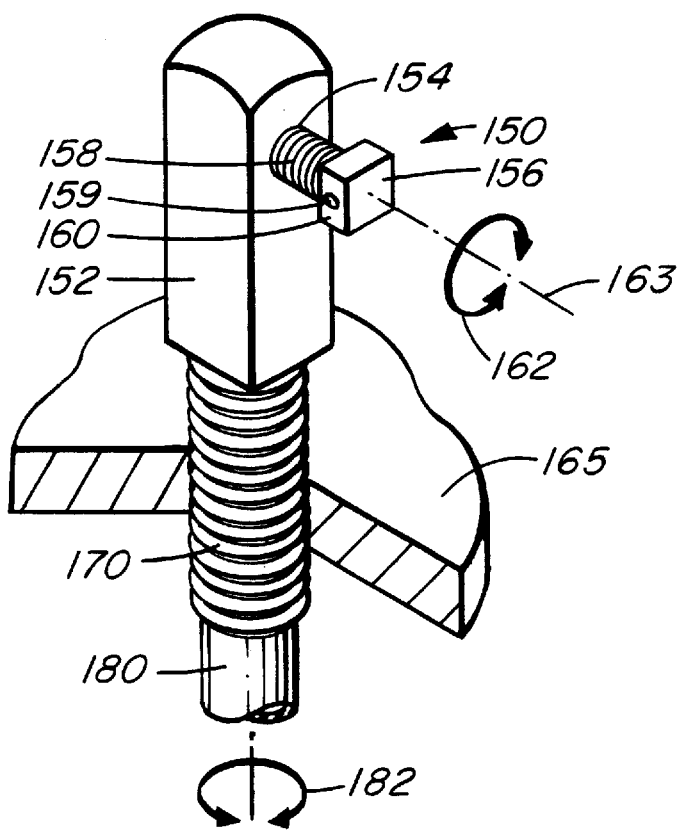
FIG. 7 is an isometric view of one of the spray nozzles for the embodiment of FIG. 1 and a fragment of the discharge conduit connected thereto.

One of the spray nozzles 150, representing any of the spray nozzles shown in FIGS. 1 and 2, is shown in more detail in FIG. 7. In this example the spray nozzle is of stainless steel although other materials could be utilized. The spray nozzle has a rectangular body 152 having a threaded aperture 154 on one side thereof. There is a member 156 having a male threaded portion 158 threadedly received in the aperture 154. The member 156 has a spray aperture 159 in one of its four sides 160. It may be seen that the member can be rotated, as indicated by arrows 162, about an axis 163 which is generally parallel to a surface 165 of an outer panel of the marine craft where the nozzle is mounted. Thus the spray can be directed appropriately toward the windshield.

The body has a male threaded shank 170 for extending through a suitable aperture in the deck or other surface of the marine craft. A nut, similar to the nut 128 shown in FIG. 5, is fitted to the shank to hold the spray nozzle in position on the marine craft. Discharge conduit 180 extends to one of the pumps shown in FIG. 3. It may be appreciated that the nozzle can be rotated about the shank 170, as shown by arrows 182, to direct the washer fluid properly toward the windshield.

It will be understood by someone skilled in the art that many of the details provided above are by way of example only and are not intended to limit the scope of the invention which is to be interpreted with reference to the following claims:

What is claimed is:

1. A windshield washing apparatus for marine craft, comprising:
    a reservoir container having a bracket pivotally connected thereto, whereby the bracket can be connected to vertical, horizontal or sloping surfaces on the marine craft while the container remains level;
    a pump mounted on the reservoir container;
    a filler fitting having a connector for mounting the fitting on a surface of the marine craft remote from the reservoir container;
    a first conduit for connecting the reservoir container to the filler fitting;
    a spray nozzle; and
    a second conduit for connecting the pump to the spray nozzle.

2. The windshield washing apparatus as claimed in claim 1, wherein the reservoir container has positions thereon for a plurality of pumps.

3. The windshield washing apparatus as claimed in claim 2, wherein the container has a recessed portion, the positions for the pumps being on the recessed portion, whereby the bracket can pivot about the container and the pumps.

4. The windshield washing apparatus as claimed in claim 3, wherein the container has a bottom, the recessed portion extending about the bottom.

5. The windshield washing apparatus as claimed in claim 4, wherein the container has a central, rectangular protrusion adjacent to the bottom, the positions for the pumps being on sides of the protrusion.

6. The windshield washing apparatus as claimed in claim 5, wherein the bracket is U-shaped and the container has opposite sides, the bracket being pivotally connected to the sides of the container, extends between the sides and has an outer member spaced-apart from the container.

7. The windshield washing apparatus as claimed in claim 1, wherein the filler fitting has a flange for mounting on an exterior surface of the marine craft above the reservoir container, a male threaded shank for extending through an aperture in a panel-like member of the marine craft and a female threaded member for engaging the shank on a side of the panel-like member opposite the flange.

8. The windshield washing apparatus as claimed in claim 7, wherein the filler fitting has a closure member removably connected thereto.

9. The windshield washing apparatus as claimed in claim 8, wherein the filler fitting has a female threaded aperture extending through the shank, the closure member having a male threaded portion engageable with the female threaded aperture through the shank.

10. The windshield washing apparatus as claimed in claim 1, wherein the spray nozzle has a body and a member rotatably connected to the body having a spray aperture therein, whereby the spray aperture can be rotated about the body to spray liquid in different directions.

11. The windshield washing apparatus as claimed in 10, wherein the body has a threaded shank for extending through an outer panel of the marine craft having an outer surface, the member being rotatable about an axis parallel to the surface and the spray aperture being in a side of the member and the body being rotatable about the threaded shank, whereby liquid may be sprayed in different angular directions relative to the surface.

12. The windshield washing apparatus as claimed in claim 1, wherein the reservoir container has a plurality of pumps mounted thereon and the apparatus includes a plurality of spray nozzles, each said spray nozzle being connected to a different said pump by a separate conduit.

13. The windshield washing apparatus as claimed in claim 4, wherein the container has a ridge extending along the recessed portion and spaced apart from pumps mounted on the reservoir container, whereby liquids dripping down the reservoir container are deflected from the pumps.

14. A marine craft having a plurality of windshield surfaces and a windshield washing apparatus for washing the surfaces, the apparatus comprising:
    a reservoir container having a bracket pivotally connected thereto, whereby the bracket can be connected to vertical, horizontal or sloping surfaces on the marine craft while the container remains level;
    a plurality of pumps mounted on the reservoir container, one said pump for each said windshield surface;
    a filler fitting having a connector for mounting the fitting on a surface of the marine craft remote from the reservoir container;
    a spray nozzle adjacent to each said windshield surface;
    a filler conduit connecting the filler fitting to the reservoir container; and
    a plurality of discharge conduits, each said discharge conduit connecting one of the pumps to one of the spray nozzles.

15. The marine craft as claimed in claim 14, wherein the container has a recessed portion, the pumps being positioned on the recessed portion, whereby the bracket can pivot about the container and the pumps.

16. The marine craft as claimed in claim 15, wherein the container has a bottom, the recessed portion extending about the bottom.

17. The marine craft as claimed in claim 16, wherein the container has a central, rectangular protrusion adjacent to the bottom, the positions for the pumps being on sides of the protrusion.

18. The marine craft as claimed in claim 17, wherein the bracket is U-shaped and the container has opposite sides, the bracket being pivotally connected to the sides of the container, extends between the sides and has an outer member spaced-apart from the container.

19. The marine craft as claimed in claim 14, wherein the filler fitting has a flange for mounting on an exterior surface of the marine craft above the reservoir container, a male threaded shank for extending through an aperture in a panel-like member of the marine craft and a female threaded member for engaging the shank on a side of the panel-like member opposite the flange.

20. The marine craft as claimed in claim 19, wherein the filler fitting has a closure member removably connected thereto.

21. The marine craft as claimed in claim 20, wherein the filler fitting has a female threaded aperture extending through the shank, the closure member having a male threaded portion engageable with the female threaded aperture through the shank.

22. The marine craft as claimed in claim 14, wherein each said spray nozzle has a body and a member connected to the body rotatably about an axis and having a spray aperture therein, whereby the spray aperture can be rotated about the axis to spray liquid in different directions.

23. The marine craft as claimed in claim 22, wherein the body has a threaded shank for extending through an outer panel of the marine craft having an outer surface, the axis being parallel to the surface and the spray aperture being in a side of the member and the body being rotatable about the threaded shank, whereby liquid may be sprayed in different angular directions relative to the surface.

24. The marine craft as claimed in claim 16, wherein the container has a ridge extending along the recessed portion and spaced apart from pumps mounted on the reservoir container, whereby liquids dripping down the reservoir container are deflected from the pumps.

* * * * *